United States Patent
Shibata et al.

(10) Patent No.: US 7,633,965 B2
(45) Date of Patent: Dec. 15, 2009

(54) DATA TRANSFER CONTROL DEVICE AND ELECTRONIC INSTRUMENT

(75) Inventors: Yukinari Shibata, Sapporo (JP); Tomonaga Hasegawa, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 697 days.

(21) Appl. No.: 11/073,839

(22) Filed: Mar. 8, 2005

(65) Prior Publication Data
US 2005/0201411 A1    Sep. 15, 2005

(30) Foreign Application Priority Data
Mar. 9, 2004    (JP)    ............................ 2004-066090

(51) Int. Cl.
 H04J 3/00    (2006.01)
 H04L 12/66    (2006.01)
(52) U.S. Cl. .................... 370/463; 370/357; 370/476; 370/431; 370/420; 704/233; 375/368
(58) Field of Classification Search ........... 370/463, 370/357, 366, 368, 360, 431, 476; 704/233; 341/50; 375/368; 348/384
See application file for complete search history.

(56) References Cited

U.S. PATENT DOCUMENTS

| | | | | |
|---|---|---|---|---|
| 4,506,386 A | * | 3/1985 | Ichikawa et al. | ........... 455/343.3 |
| 5,819,218 A | * | 10/1998 | Hayata et al. | ................ 704/233 |
| 6,028,631 A | * | 2/2000 | Nakaya et al. | ......... 375/240.01 |
| 6,581,114 B1 | | 6/2003 | Sturm | |
| 7,187,307 B1 | * | 3/2007 | Schmidt et al. | ................ 341/50 |
| 2001/0036203 A1 | * | 11/2001 | Yamaguchi et al. | .......... 370/535 |
| 2002/0011998 A1 | | 1/2002 | Tamura | |
| 2003/0142693 A1 | * | 7/2003 | Umayabashi et al. | ........ 370/476 |
| 2005/0195930 A1 | * | 9/2005 | Spital et al. | ................. 375/368 |
| 2005/0201305 A1 | | 9/2005 | Shibata et al. | |

FOREIGN PATENT DOCUMENTS

| | | |
|---|---|---|
| JP | A 2000-32081 | 1/2000 |
| JP | A 2000-183894 | 6/2000 |
| JP | A 2001-156763 | 6/2001 |

(Continued)

OTHER PUBLICATIONS

U.S. Appl. No. 11/073,857, filed Mar. 8, 2005, Yukinari Shibata et al.

(Continued)

*Primary Examiner*—Aung S Moe
*Assistant Examiner*—Jamal Javaid
(74) *Attorney, Agent, or Firm*—Oliff & Berridge, PLC

(57) ABSTRACT

A data transfer control device includes: an encoder circuit which performs encoding data and generation of a special code; a parallel/serial conversion circuit which converts parallel data from the encoder circuit to serial data; and a transmitter circuit which receives the serial data and transmits the special code and the data through the serial signal line. The transmitter circuit outputs an idle signal, logical level of which is continuously fixed at a first logical level in units of a given number of bits or more to the serial signal line as a signal indicating an idle state. The encoder circuit suspends operation after an indication that there is no transmission data by a transmission data valid/invalid signal from an upper layer circuit.

9 Claims, 16 Drawing Sheets

FOREIGN PATENT DOCUMENTS

| | | |
|---|---|---|
| JP | A-2001-222249 | 8/2001 |
| JP | A 2002-101084 | 4/2002 |
| JP | A 2003-224573 | 8/2003 |
| JP | A 2005-142643 | 6/2005 |
| JP | A 2005-260361 | 9/2005 |

OTHER PUBLICATIONS

U.S. Appl. No. 11/073,853, filed Mar. 8, 2005, Yukinari Shibata et al.
Satomi et al; "A complete study of the high speed bus system"; Interface; vol. 29; No. 7; pp. 80-100; Jul. 2003; w/ partial translation.
IEEE Std. 802.3; 2000 Edition; 36.2.4 8B/10B transmission code.

* cited by examiner

FIG. 4

| K CODE NAME | ASSIGNED CODE NAME | CurrentRd− | CurrentRd+ |
|---|---|---|---|
| K28.0 | Reserved | 001111010100 | 110000101011 |
| K28.1 | PREAMBLE(PRE) | 001111101001 | 110000010110 |
| K28.2 | STOP | 001111010101 | 110000101010 |
| K28.3 | ABORT | 001111110011 | 110000001100 |
| K28.4 | DIVISION | 001111110010 | 110000001101 |
| K28.5 | DATA POWER DOWN | 001111111010 | 110000000101 |
| K28.6 | DIRECTION | 001111110110 | 110000001001 |
| K28.7 | ALL POWER DOWN | 001111111000 | 110000000111 |
| K23.7 | Reserved | 111010101000 | 000101010111 |
| K27.7 | Reserved | 110110101000 | 001001010111 |
| K29.7 | Reserved | 101111101000 | 010000010111 |
| K30.7 | Reserved | 011111101000 | 100000010111 |

FIG. 11

| RxCode VALUE | TRANSFER RATE |
|---|---|
| 0 | DATA RECEPTION |
| 1 | ABORT DETECTION |
| 2 | Data Powerdown |
| 3 | All Powerdown |
| 4 | PREAMBLE DETECTION (PRE) |
| 5 | DUMMY DETECTION |
| 6 | RECEPTION ERROR DETECTION |
| 7 | Reserved |
| 8 | Reserved |
| 9 | Reserved |
| A | Reserved |
| B | Reserved |
| C | Reserved |
| D | Reserved |
| E | MULTICHANNEL DIVISION TRANSFER NOTIFICATION DETECTION |
| F | TRANSFER DIRECTION SWITCH REQUEST RECEPTION (DIR) |

FIG. 12

| TxCode VALUE | TRANSFER RATE |
|---|---|
| 0 | DATA TRANSMISSION |
| 1 | ABORT |
| 2 | Data Powerdown |
| 3 | All Powerdown |
| 4 | PREAMBLE INSERTION (PRE) |
| 5 | DUMMY INSERTION |
| 6 | Reserved |
| 7 | Reserved |
| 8 | Reserved |
| 9 | Reserved |
| A | Reserved |
| B | Reserved |
| C | Reserved |
| D | Reserved |
| E | MULTICHANNEL DIVISION TRANSFER EXECUTION NOTIFICATION |
| F | TRANSFER DIRECTION SWITCH REQUEST (DIR) |

DATA TRANSFER CONTROL DEVICE AND ELECTRONIC INSTRUMENT

Japanese Patent Application No. 2004-66090, filed on Mar. 9, 2004, is hereby incorporated by reference in its entirety.

BACKGROUND OF THE INVENTION

The present invention relates to a data transfer control device and an electronic instrument.

In recent years, a high-speed serial transfer interface such as low voltage differential signaling (LVDS) has attracted attention as an interface standard aiming at reducing EMI noise or the like. In such a high-speed serial transfer interface, data transfer is implemented by causing a transmitter circuit to transmit serialized data using differential signals and a receiver circuit to differentially amplify the differential signals (Japanese Patent Application Laid-open No. 2001-222249).

An ordinary portable telephone includes a first instrument section provided with buttons for inputting a telephone number or a character, a second instrument section provided with a main liquid crystal display (LCD), a sub LCD, or a camera, and a connection section such as a hinge which connects the first and second instrument sections. In this case, the number of interconnects passing through the connection section can be reduced by performing data transfer between a first substrate provided in the first instrument section and a second substrate provided in the second instrument section by serial transfer using serial signal lines. Therefore, a high-speed serial interface which can implement efficient serial transfer in the connection section has been demanded.

In such a high-speed serial interface, an idle state which is a state in which data is not transferred on a bus is defined. In IEEE1394 which is one of the high-speed serial interfaces, the right to exclusively access the bus is arbitrated among a plurality of nodes, and a node which wins the arbitration exclusively accesses the bus. Therefore, since the node which has lost the right to exclusively access the bus releases the bus, that node does not drive the serial signal lines in the idle period.

In PCI Express which has attracted attention as a high-speed serial interface for a personal computer, an idle code is output to the serial signal line in the idle period. However, the method of outputting the idle code in the idle period requires that an encoder circuit (code generation circuit) and a decoder circuit (code detection circuit) of a data transfer control device operate even in the idle period. In a personal computer which is the target of PCI Express, since a reduction of power consumption is not strongly demanded, a considerable problem does not occur even if the idle code is output in the idle period. However, a reduction of power consumption during standby is strongly demanded for a portable information device such as a portable telephone. Therefore, a data transfer control device which can reduce power consumption in the idle period is demanded.

SUMMARY

A first aspect of the present invention relates to a data transfer control device for performing data transfer through a serial signal line, the data transfer control device including:

an encoder circuit which performs processing of encoding data by using a predetermined encoding method and generation processing of a special code defined by the encoding method;

a parallel/serial conversion circuit which receives parallel data from the encoder circuit and converts the parallel data to serial data; and a transmitter circuit which receives the serial data from the parallel/serial conversion circuit and transmits the special code and the data through the serial signal line, wherein the transmitter circuit outputs an idle signal, logical level of which is continuously fixed at a first logical level in units of a given number of bits or more to the serial signal line as a signal indicating an idle state, and wherein, when absence of the transmission data due to an idle period has been indicated by a transmission data valid/invalid signal from an upper layer circuit, the encoder circuit suspends operation after the indication of the absence of the transmission data.

A second aspect of the present invention relates to a data transfer control device for performing data transfer through a serial signal line, the data transfer control device indicating:

a receiver circuit which receives a special code and data through the serial signal line;

a serial/parallel conversion circuit which receives serial data from the receiver circuit and converts the serial data to parallel data;

an idle detection circuit which detects an idle signal, logical level of which is continuously fixed at a first logical level in units of a given number of bits or more; and a decoder circuit which receives parallel data from the serial/parallel conversion circuit and performs decode processing of the data and the special code which have been encoded by using a predetermined encoding method, wherein the serial/parallel conversion circuit suspends operation after the idle signal has been detected by the idle detection circuit and output of parallel data from the serial/parallel conversion circuit has been completed.

A fourth aspect of the present invention relates to an electronic instrument including:

one of the above data transfer control devices; and at least one of a communication device, a processor, an imaging device, and a display device.

BRIEF DESCRIPTION OF THE SEVERAL VIEWS OF THE DRAWING

FIG. 4 is illustrative of a method of assigning various codes to special codes.

FIG. 11 is an example of RxCode.

FIG. 12 is an example of TxCode.

DETAILED DESCRIPTION OF THE EMBODIMENT

Figure 1:
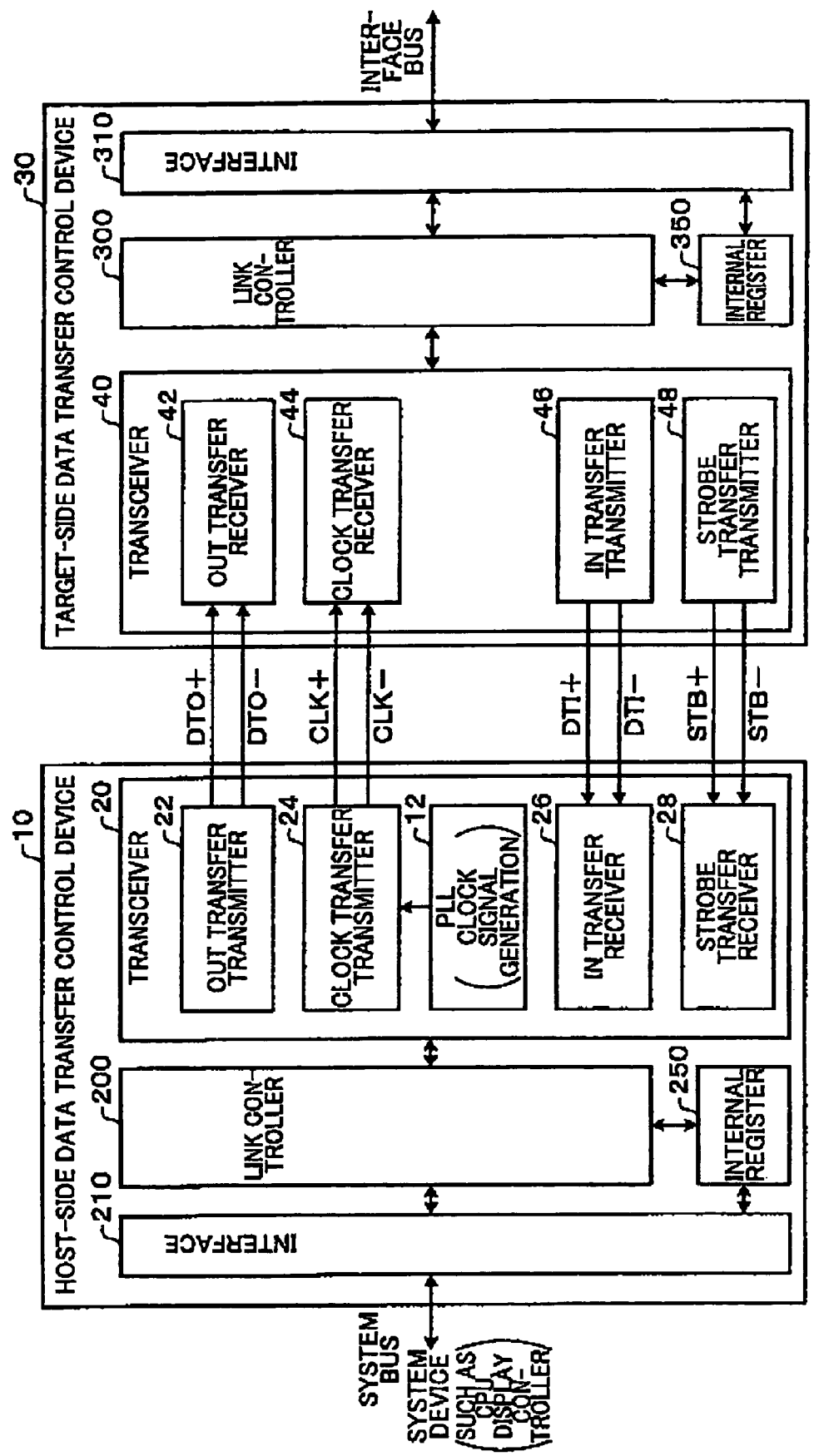
FIG. 1 is a configuration example of a data transfer control device.

The present invention has been achieved in view of the above-described technical problem, and may provide a data transfer control device and an electronic instrument capable of reducing power consumption in the idle period.

One embodiment of the present invention provides a data transfer control device for performing data transfer through a serial signal line, the data transfer control device including:

an encoder circuit which performs processing of encoding data by using a predetermined encoding method and generation processing of a special code defined by the encoding method;

a parallel/serial conversion circuit which receives parallel data from the encoder circuit and converts the parallel data to serial data; and a transmitter circuit which receives the serial data from the parallel/serial conversion circuit and transmits the special code and the data through the serial signal line, wherein the transmitter circuit outputs an idle signal, logical level of which is continuously fixed at a first logical level in units of a given number of bits or more to the serial signal line as a signal indicating an idle state, and wherein, when absence of the transmission data due to an idle period has been indicated by a transmission data valid/invalid signal from an upper layer circuit, the encoder circuit suspends operation after the indication of the absence of the transmission data.

According to this embodiment, a signal, logical level of which is fixed at the first logical level is output to the serial signal line as the idle signal. When the absence of transmission data is indicated by the transmission data valid/invalid signal from the upper layer circuit (when the idle period is indicated), the operation of the encoder circuit is suspended after this indication. This prevents a problem in which electric power is uselessly consumed by the encoder circuit in the idle period, whereby power consumption can be reduced.

With this data transfer control device, the parallel/serial conversion circuit may suspend operation after the absence of the transmission data has been indicated by the transmission data valid/invalid signal and output of serial data from the parallel/serial conversion circuit has been completed.

This enables power consumption to be reduced while preventing a problem in which data of which the processing in the parallel/serial conversion circuit has not been completed is lost by suspension of the circuit operation.

This data transfer control device may include an operation suspension circuit which suspends operations of the encoder circuit and the parallel/serial conversion circuit, and the operation suspension circuit may suspend operations of the encoder circuit and the parallel/serial conversion circuit by suspending a clock signal supplied to the encoder circuit and the parallel/serial conversion circuit.

This reduces the amount of electric power consumed by the encoder circuit and a D flip-flop circuit of the parallel/serial conversion circuit in the idle period.

With this data transfer control device, the encoder circuit may encode data by using an encoding method which expands N bits of data to M bits (N<M; N and M are integers larger than one) of data, and the transmitter circuit may output the idle signal, logical level of which is continuously fixed at the first logical level in units of M bits or more to the serial signal line.

The configuration and processing of the circuit which detects the idle signal or the special code can be simplified by defining the idle signal as described above.

With this data transfer control device, the encoder circuit may encode data by using an encoding method which expands N bits of data to M bits (N<M; N and M are integers larger than one) of data, and the transmitter circuit may output an M-bit special code through the serial signal line.

With this data transfer control device, the encoder circuit may receive a special code generation direction signal from the upper layer circuit, and may perform the generation processing of the special code indicated by the special code generation direction signal.

The processing and configuration of the encoder circuit can be simplified by generating the special code by using the special code generation direction signal as described above, whereby the circuit scale can be reduced.

With this data transfer control device, the transmitter circuit may transmit a first polarity preamble code and a second polarity preamble code as the special code through the serial signal line.

According to this feature, even when the idle signal fixed at the first logical level is output, a partner-side data transfer control device can reliably implement preparations for reception by detecting the preamble code.

Another embodiment of the present invention provides a data transfer control device, for performing data transfer through a serial signal line, the data transfer control device including:

a receiver circuit which receives a special code and data through the serial signal line;

a serial/parallel conversion circuit which receives serial data from the receiver circuit and converts the serial data to parallel data;

an idle detection circuit which detects an idle signal, logical level of which is continuously fixed at a first logical level in units of a given number of bits or more; and a decoder circuit which receives parallel data from the serial/parallel conversion circuit and performs decode processing of the data and the special code which have been encoded by using a predetermined encoding method, wherein the serial/parallel conversion circuit suspends operation after the idle signal has been detected by the idle detection circuit and output of parallel data from the serial/parallel conversion circuit has been completed.

According to this embodiment, a signal, logical level of which is fixed at the first logical level is detected as the idle signal. After the idle signal has been detected and output of the parallel data has been completed, the operation of the serial/parallel circuit is suspended. This prevents a problem in which electric power is uselessly consumed by the serial/parallel conversion circuit in the idle period, whereby power consumption can be reduced.

With this data transfer control device, the decoder circuit may suspend operation after the idle signal has been detected by the idle detection circuit and output of decoded data from the decoder circuit has been completed.

This enables power consumption to be reduced while preventing a problem in which data of which the processing has not been completed in the decoder circuit is lost by suspension of the circuit operation.

This data transfer control device may include an operation suspension circuit which suspends operations of the decoder circuit and the serial/parallel conversion circuit, and the operation suspension circuit may suspend operations of the decoder circuit and the serial/parallel conversion circuit by suspending a clock signal supplied to the decoder circuit and the serial/parallel conversion circuit.

This reduces the amount of electric power consumed by the decoder circuit and D flip-flop circuits of the serial/parallel conversion circuit in the idle period.

This data transfer control device may include a preamble error detection circuit which performs detection processing of a preamble code which is the special code and informs a preamble error when the preamble code has not been detected, and when a first polarity preamble code and a second polarity preamble code are transferred through the serial signal line, the preamble error detection circuit may omit performing detection processing of the first polarity preamble code which has been received first and may perform detection processing of the second polarity preamble code which has been received after the first polarity preamble code.

If the second polarity preamble code is detected ignoring the first polarity preamble code, a problem in which a preamble error is informed by a detection error can be prevented, even if the detection error occurs when it is impossible to follow the level change at the first bit of the first polarity preamble code. This improves reliability of data transfer.

A further embodiment of the present invention provides an electronic instrument including:

one of the above data transfer control devices; and at least one of a communication device, a processor, an imaging device, and a display device.

The embodiments of the present invention are described below in detail with reference to the drawings. Note that the embodiments described hereunder do not in any way limit the scope of the invention defined by the claims laid out herein. Note also that not all of the elements of these embodiments should be taken as essential requirements to the means of the present invention.

1. Configuration Example of Data Transfer Control Device

FIG. 1 shows a configuration example of host-side and target-side data transfer control devices 10 and 30. In this embodiment, a bridge function between a system bus and an interface bus is implemented by using the host-side and target-side data transfer control devices 10 and 30. The data transfer control devices 10 and 30 are not limited to the configurations shown in FIG. 1. Some of the circuit blocks shown in FIG. 1 may be omitted, or the connection configuration between the circuit blocks may be changed, or a circuit block differing from those shown in FIG. 1 may be added. A configuration in which at least one of link controllers 200 and 300 and interface circuits 210 and 310 is omitted may also be employed.

The host (TX) side data transfer control device 10 and the target (RX) side data transfer control device 30 transfer packets through a serial bus for differential signals, for example. In more detail, the data transfer control devices 10 and 30 transmit and receive packets by current-driving (or voltage-driving) differential signal lines (serial signal lines in a broad sense; hereinafter the same) of the serial bus.

The host-side data transfer control device 10 includes an interface circuit 210 which performs interface processing between the data transfer control device 10 and a system device such as a CPU or a display controller. The interface circuit 210 implements an RGB interface, an MPU interface, or a serial interface between the data transfer control device 10 and the system device.

The host-side data transfer control device 10 includes the link controller 200 which performs link layer processing (packet generation, packet analysis, transaction control, or the like). The link controller 200 performs processing of generating a packet (request packet, stream packet, or the like) transferred to the target-side data transfer control device 30 through the serial bus, and transmitting the generated packet. In more detail, the link controller 200 initiates a transmission transaction and directs a transceiver 20 to transmit the generated packet.

The host-side data transfer control device 10 includes the transceiver 20 which performs physical layer processing or the like. The transceiver 20 transmits a packet indicated by the link controller 200 to the target-side data transfer control device 30 through the serial bus. The transceiver 20 also receives a packet from the target-side data transfer control device 30. In this case, the link controller 200 analyzes the received packet and performs the link layer (transaction layer) processing.

The host-side data transfer control device 10 includes an internal register 250. The internal register 250 includes a port access register, a configuration register, an LVDS register, an interrupt control register, a target (RX) register, a power down mode setting register, and the like. The system device writes an address (command) or data (parameter) into the internal register 250 through the system bus, or reads read data, status information, or the like from the internal register 250. The information stored in the target register of the internal register 250 is packetized and transferred to an internal register 350 of the target-side data transfer control device 30 through the serial bus. Specifically, the target-side internal register 350 is a subset (shadow register) of the host-side internal register 250.

The target-side data transfer control device 30 includes the transceiver 40 which performs physical layer processing or the like. The transceiver 40 receives a packet from the host-side data transfer control device 10 through the serial bus. The transceiver 40 also transmits a packet to the host-side data transfer control device 10. In this case, the link controller 300 generates a packet to be transmitted and directs transmission of the generated packet.

The target-side data transfer control device 30 includes the link controller 300. The link controller 300 performs link layer (transaction layer) processing of receiving a packet from the host-side data transfer control device 10 and analyzing the received packet.

The target-side data transfer control device 30 includes the interface circuit 310 which performs interface processing between the data transfer control device 30 and one or more devices (main LCD, sub LCD, camera, or the like) connected to the interface bus. The interface circuit 310 may include an RGB interface circuit, an MPU interface circuit, a serial interface circuit, or the like (not shown).

The target-side data transfer control device 30 includes the internal register 350. The internal register 350 stores information necessary for the target. In more detail, the internal register 350 stores interface information for specifying the signal type (output format) of an interface signal output from the interface circuit 310 or the like.

2. Serial Transfer Method

A serial transfer method in this embodiment and a configuration example of the transceivers 20 and 40 are described below. In this embodiment, the host-side data transfer control device 10 supplies a clock signal, and the target-side data transfer control device 30 operates using the supplied clock signal as a system clock signal.

In FIG. 1, DTO+ and DTO− indicate data (OUT data) output from the host (data transfer control device 10) to the target (data transfer control device 30). CLK+ and CLK− indicate clock signals supplied from the host to the target. The host outputs the data DTO+/− in synchronization with the edge (rising edge, for example; may be falling edge) of the clock signals CLK+/−. Therefore, the target can sample and store the data DTO+/− using the clock signals CLK+/−. In FIG. 1, the target operates based on the clock signals CLK+/− supplied from the host. Specifically, the clock signals CLK+/− serve as the system clock signals of the target. Therefore, a phase locked loop (PLL) circuit 12 (clock signal generation circuit in a broad sense) is provided in the host, and is not provided in the target. The clock signal CLK may be supplied using a system clock signal from the outside without providing the PLL circuit 12.

DTI+ and DTI− indicate data (IN data) output from the target to the host. STB+ and STB− indicate strobes (clock signals in a broad sense) supplied from the target to the host. The target generates the strobes STB+/− based on the clock signals CLK+/− supplied from the host, and outputs the generated the strobes STB+/−. The target outputs the data DTI+/− in synchronization with the edge (rising edge, for example; may be falling edge) of the strobes STB+/−. Therefore, the host can sample and store the data DTI+/− using the strobes STB+/−.

Each of the data DTO+/−, the clock signals CLK+/−, the data DTI+/−, and the strobes STB+/− is transmitted by causing a transmitter circuit (driver circuit) to current-drive (voltage-drive) the corresponding differential signal line (serial signal line). In order to implement a higher speed transfer, two or more pairs of the DTO+/− differential signal lines and the DTI+/− differential signal lines may be provided.

The host-side transceiver 20 includes OUT transfer (data transfer in a broad sense) and clock transfer transmitter circuits 22 and 24, and IN transfer (data transfer in a broad sense) and strobe transfer (clock transfer in a broad sense) receiver circuits 26 and 28. The target-side transceiver 40 includes OUT transfer and clock transfer receiver circuits 42 and 44, and IN transfer and strobe transfer transmitter circuits 46 and 48. A configuration in which some of these circuit blocks are omitted may be employed. In the case where full-duplex transfer is unnecessary, a configuration in which the host-side receiver circuits 26 and 28 and the target-side transmitter circuits 46 and 48 are omitted may be employed.

The OUT transfer and clock transfer transmitter circuits 22 and 24 respectively transmit the data DTO+/− and the clock signals CLK+/− by current-driving the DTO+/− differential signal lines and the CLK+/− differential signal lines (driving the serial signal lines in a broad sense). The OUT transfer and clock transfer receiver circuits 42 and 44 respectively receive the data DTO+/− and the clock signals CLK+/− by performing a current/voltage conversion based on the current which flows through the DTO+/− differential signal lines and the CLK+/− differential signal lines, and performing comparison processing (differential amplification processing) between the differential voltage signals (first and second voltage signals) obtained by the current/voltage conversion.

The IN transfer and clock transfer transmitter circuits 46 and 48 respectively transmit the data DTI+/− and the strobes STB+/− by current-driving the DTI+/− differential signal lines and the STB+/− differential signal lines (driving the serial signal lines). The IN transfer and strobe transfer receiver circuits 26 and 28 respectively receive the data DTI+/− and the strobes STB+/− by performing a current/voltage conversion based on the current which flows through the DTI+/− differential signal lines and the STB+/− differential signal lines, and performing comparison processing (differential amplification processing) between the differential voltage signals (first and second voltage signals) obtained by the current/voltage conversion. The following description is given taking the differential transfer method using the differential signals as an example. However, this embodiment may also be applied to single-end transfer.

3. Detailed Configuration Example

Figure 2:
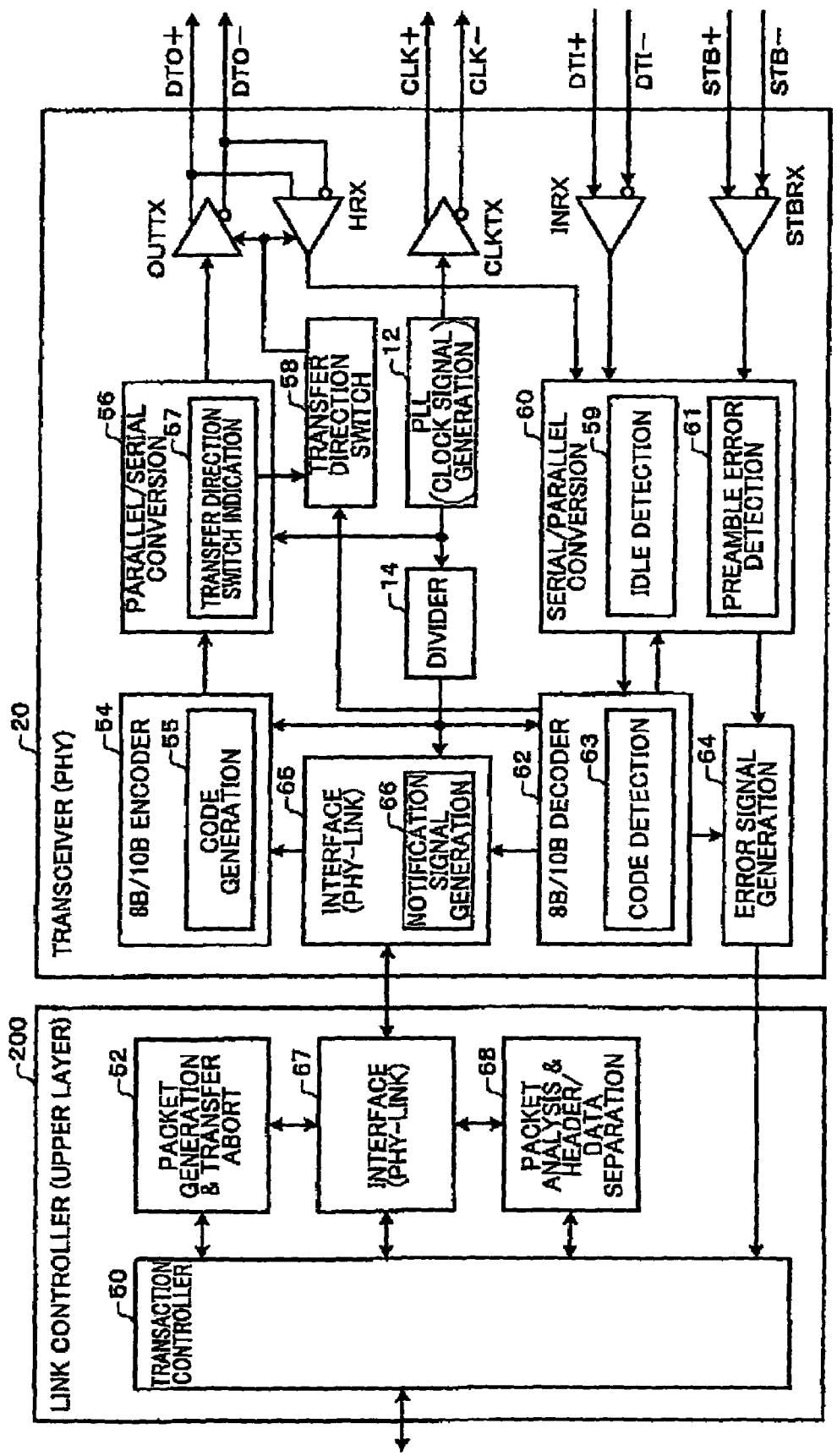
FIG. 2 is a configuration example of a host-side transceiver and link controller.
Figure 3:
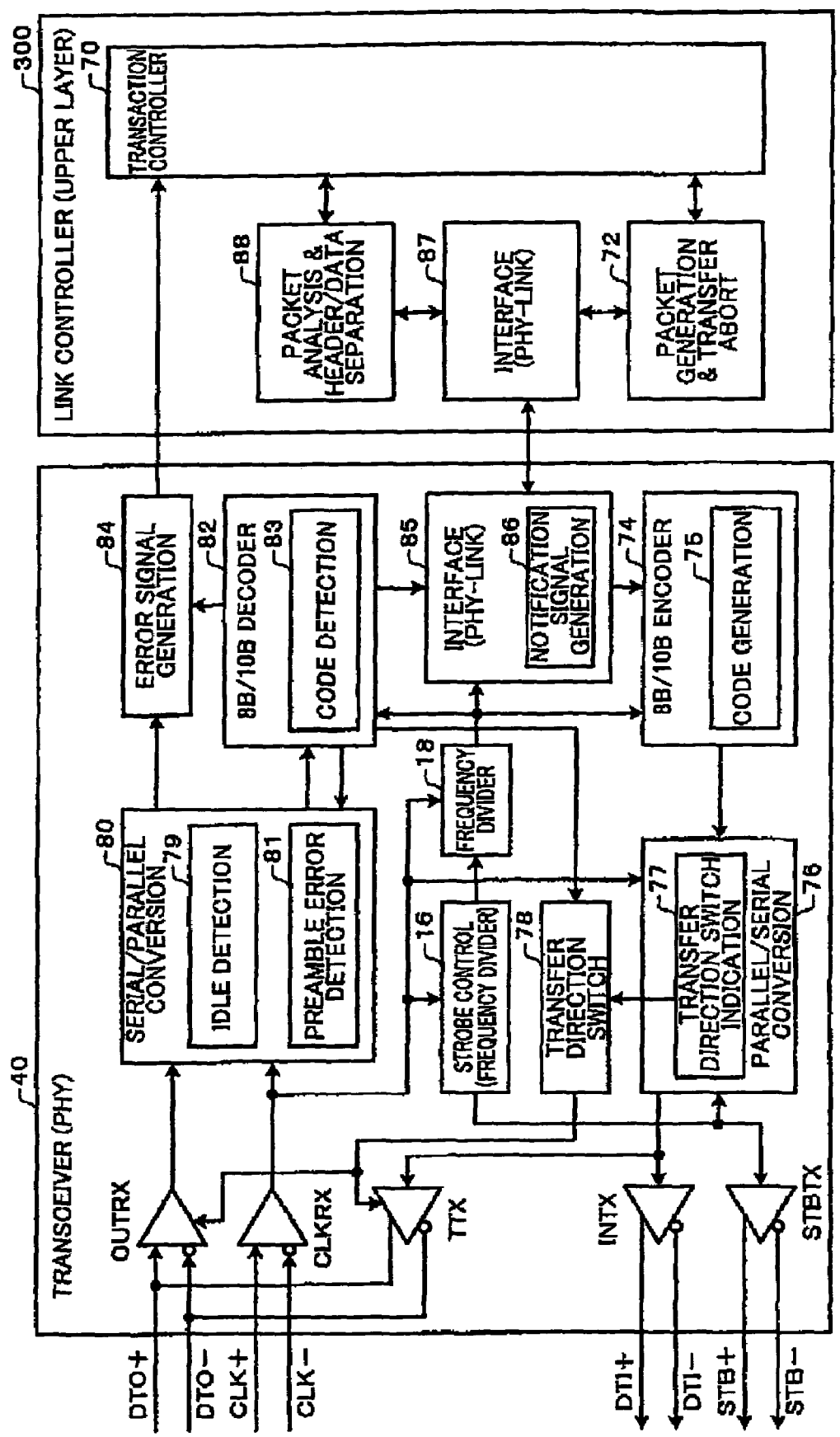
FIG. 3 is a configuration example of a target-side transceiver and link controller.

FIGS. 2 and 3 show detailed configuration examples in this embodiment. A configuration in which some of the circuit blocks shown in FIGS. 2 and 3 are omitted or another circuit block is added may also be employed. In the following description, the host-side transmitter circuits 22 and 24 and receiver circuits 26 and 28 are appropriately indicated by OUTTX, CLKTX, INRX, and STBRX, respectively. The target-side transmitter circuits 42 and 44 and receiver circuits 46 and 48 are appropriately indicated by OUTRX, CLKRX, INTX, and STBTX, respectively.

FIG. 2 is a configuration example of the host-side transceiver 20 and link controller 200. In FIG. 2, a transaction controller 50 included in the link controller 200 (upper layer circuit in a broad sense) performs transaction control of data transfer. In more detail, the transaction controller 50 directs transfer of packets such as a request packet, an acknowledge packet, or a stream packet. A packet generation & transfer abort circuit 52 performs processing of generating a packet (packet header) of which transfer is directed by the transaction controller 50, and processing of aborting data transfer.

An 8B/10B encoder circuit 54 (encoder circuit in a broad sense) included in the transceiver 20 performs processing of encoding data using an 8B/10B encoding method (encoding method which expands N bits to M bits (N<M; N and M are integers larger than one) in a broad sense). A code generation circuit 55 included in the 8B/10B encoder circuit 54 performs generation processing of a 10-bit (M-bit in a broad sense) special code specified by the 8B/10B encoding. In more detail, the code generation circuit 55 performs generation processing or addition processing of a preamble code, a stop code, an abort code, or a direction code (transfer direction switch request code) assigned to the special code of the 8B/10B encoding method. The encoding method performed by the encoder circuit 54 is not limited to the 8B/10B encoding method.

A parallel/serial conversion circuit 56 converts parallel data received from the 8B/10B encoder circuit 54 to serial data. The circuit OUTTX receives the serial data from the parallel/serial conversion circuit 56, and transmits the data by driving the DTO+/− serial signal lines. The circuit CLKTX receives the clock signal generated by the PLL circuit 12, and transmits the clock signal by driving the CLK+/− serial signal lines. The circuits OUTTX and CLKTX may be formed by analog circuits which current-drive (or voltage-drive) the serial signal lines. The clock signal generated by the PLL circuit 12 is divided by a frequency divider circuit 14, and is supplied to the circuit blocks (blocks which process parallel data) in the transceiver 20 and the link controller 200.

The circuit INRX receives data transferred through the DTI+/− serial signal lines, and outputs the received serial data to a serial/parallel conversion circuit 60. The circuit STBRX receives strobes (clock signals) transferred through the STB+/− serial signal lines, and outputs the received strobes to the serial/parallel conversion circuit 60. The circuits INRX and STBRX may be formed by analog circuits which detect the drive current (or drive voltage) of the serial signal lines.

The serial/parallel conversion circuit 60 converts serial data transferred through the DTI+/− serial signal lines to parallel data. In more detail, the serial/parallel conversion circuit 60 samples serial data transferred through the DTI+/− serial signal lines based on the strobes (clock signals) transferred through the STB+/− serial signal lines. The serial/parallel conversion circuit 60 converts the sampled serial data to parallel data.

The serial/parallel conversion circuit 60 includes an idle detection circuit 59 and a preamble error detection circuit 61. The idle detection circuit 59 is a circuit which detects an idle signal consisting of a differential signal of "0" (idle signal, logical level of which is fixed at a first logical level), for example. The preamble error detection circuit 61 performs detection processing of the preamble code which is one of the special codes of the 8B/10B encoding method. When a preamble error, which is an error state in which the preamble code is not detected, has been detected, the preamble error detection circuit 61 notifies the link controller 200 that the preamble error has been detected.

An 8B/10B decoder circuit 62 (decoder circuit in a broad sense) performs decode processing of data and the special code encoded using the 8B/10B encoding method. A code detection circuit 63 included in the 8B/10B decoder circuit 62 performs detection processing of the special code specified by the 8B/10B encoding. In more detail, the code detection circuit 63 performs detection processing of a stop code, an abort code, or a direction code (transfer direction switch request code) assigned to the special code of the 8B/10B encoding method.

An error signal generation circuit 64 generates an error signal when the preamble error has been detected or a disparity error or a decode error has been detected, and outputs the error signal to the transaction controller 50.

An interface circuit 65 is a circuit which performs PHY-LINK (transceiver-link controller) interface processing. The interface circuit 65 includes a notification signal generation circuit 66 which generates a notification signal and outputs the notification signal to the link controller 200 (upper layer circuit). The notification signal generation circuit 66 generates a signal which indicates that a transfer direction switch request has been sent from the target-side data transfer control device 30 (partner-side data transfer control device in a broad sense), and outputs the signal to the link controller 200, for example.

A packet analysis & header/data separation circuit 68 included in the link controller 200 performs analysis processing of a received packet or processing of separating the header and data of the received packet. An interface circuit 67 included in the link controller 200 is a circuit which performs PHY-LINK interface processing.

In this embodiment, half-duplex transfer using the data DTO+ and DTO− can be performed. Therefore, a receiver circuit HRX connected with the DTO+ and DTO− serial signal lines is provided. The circuit HRX receives data transferred through the DTO+ and DTO− serial signal lines when the transfer direction is changed during half-duplex transfer. A transfer direction switch circuit 58 achieves switching between a transmission direction which is the transfer direction in which data is transmitted by the circuit OUTTX and a reception direction which is the transfer direction in which data is received by the circuit HRX. A transfer direction switch indication circuit 57 indicates the transfer direction switch circuit 58 to switch the transfer direction.

FIG. 3 is a configuration example of the target-side transceiver 40 and link controller 300. The configurations and operations of circuits 70, 72, 74, 75, 76, 77, 78, 79, 80, 81, 82, 83, 84, 85, 86, 87, and 88 shown in FIG. 3 are almost the same as the configurations and operations of the circuits 50, 52, 54, 55, 56, 57, 58, 59, 60, 61, 62, 63, 64, 65, 66, 67, and 68 shown in FIG. 2. Therefore, description of these circuits is omitted. A strobe control circuit 16 (frequency divider circuit) receives the clock signal received by the circuit CLKRX, performs strobe control such as frequency division of the clock signal, and outputs the strobe signal to the circuit STBTX. A frequency divider circuit 18 receives the clock signal received by the circuit CLKRX, and supplies the frequency-divided clock signal to the circuit blocks in the transceiver 40 and the link controller 300. A transmitter circuit TTX is used when performing half-duplex transfer using the data DTO+ and DTO−. In more detail, the transmitter circuit TTX transmits data by driving the DTO+ and DTO− serial signal lines when the transfer direction is changed during half-duplex transfer. In this case, the transfer direction switch circuit 78 switches the transfer direction, and the transfer direction switch indication circuit 77 indicates switching of the transfer direction.

4. 8B/10B Code

In the 8B/10B encoding, 256 types of 8-bit data are encoded into 256 types of 10-bit data. This encoding enables DC components to be balanced by setting the ratio of "1" to "0" of 10-bit data to 4:6, 5:5, and 6:4. In more detail, the 8B/10B encoding defines 8-bit data as A, B, C, D, E, F, G, and H from the LSB to the MSB. In the encode processing, 8-bit data is separated into an ABCDE (5-bit) data block x (decimal notation) and an FGH (3-bit) data block y (decimal notation). The separated data blocks are translated into a character code called a D code Dxy. The ABCDE block is converted to abcdei (6 bits) by 5B/6B encoding. The FGH block is converted to fghj (4 bits) by 3B/4B encoding. 10-bit encoded data is obtained by combining abcdei and fghj.

According to the 8B/10B encoding, a change in bit of a signal is increased after encoding even in data continuously containing "0" or "1", whereby occurrence of a transfer error due to noise or the like can be reduced. According to the 8B/10B encoding, since the bit width is expanded from 8 bits to 10 bits, the special code (control code) shown in FIG. 4 can be generated in addition to data.

In this embodiment, the preamble code, stop code, direction code (transfer direction switch request code), or the like is assigned to the special code obtained by the 8B/10B encoding (encoding which expands the bit width), and is transferred through the data transfer serial signal lines (DTO or DTI). In FIG. 4, codes K28.1, K28.2, K28.3, K28.4, K28.5, K28.6, and K28.7 are respectively assigned to the preamble code, stop code, abort code, division code (multi channel division transfer code), data power down code, direction code (transfer direction switch request code), and all power down code, and are transferred through the data transfer serial signal lines (DTO or DTI), for example. As a result, the receiver side detects the direction code and the like by detecting the codes K28.1 to K28.7 by performing decode processing in the 8B/10B encoding method.

As shown in FIG. 4, each code consists of a positive code (positive symbol code) and a negative code (negative symbol code). The negative code is a code obtained by reversing each bit of the positive code.

In the 8B/10B encoding, 8-bit data is converted to 10-bit positive code data and negative code data and alternately transmitted. This enables the receiver end to predict the disparity of the next data in 10 bit units, whereby an error in the transmission line can be detected.

5. Data Transfer Format

Figure 5:
FIG. 5 is a data transfer format example during normal transfer.

FIG. 5 shows a data transfer format during normal transfer. In FIG. 5, a state in which data is not transferred through the serial signal lines is the idle state. In this embodiment, a state (signal) in which the logical level of the serial signal lines is continuously fixed at a first logical level ("0", for example) in units of a given number of bits (M bits) or more is defined as the idle state (idle signal). In more detail, a state (signal) in which a differential signal of "0" is continuously output in units of 10 bits (M bits) or more is defined as the idle state (idle signal). A differential signal of "0" used herein means a state in which the amount of current flowing through the signal line (DTO− or DTI−) of the negative-side differential signal is greater than the amount of current flowing through the signal line (DTO+ or DTI+) of the positive-side differential signal. A differential signal of "1" means a state in which the amount of current flowing through the signal line of the positive-side differential signal is greater than the amount of current flowing through the signal line of the negative-side differential signal.

In this embodiment, as shown in FIG. 5, an idle signal IDLE and two preamble codes are inserted between packets when performing packet transfer. In more detail, the transmitter side outputs the idle signal IDLE consisting of a differential signal of "0" to the serial signal lines, and transmits a positive (first polarity in a broad sense) preamble code PRE+ and a negative (second polarity in a broad sense) preamble code PRE− through the serial signal lines. This enables the receiver side to acquire synchronization of a packet by detecting the preamble code. The transmitter side then transmits 8B/10B encoded positive code data DATA+ and negative code data DATA−, and transmits stop codes STOP+/−. The transmitter side then outputs the idle signal IDLE again.

Figure 6:
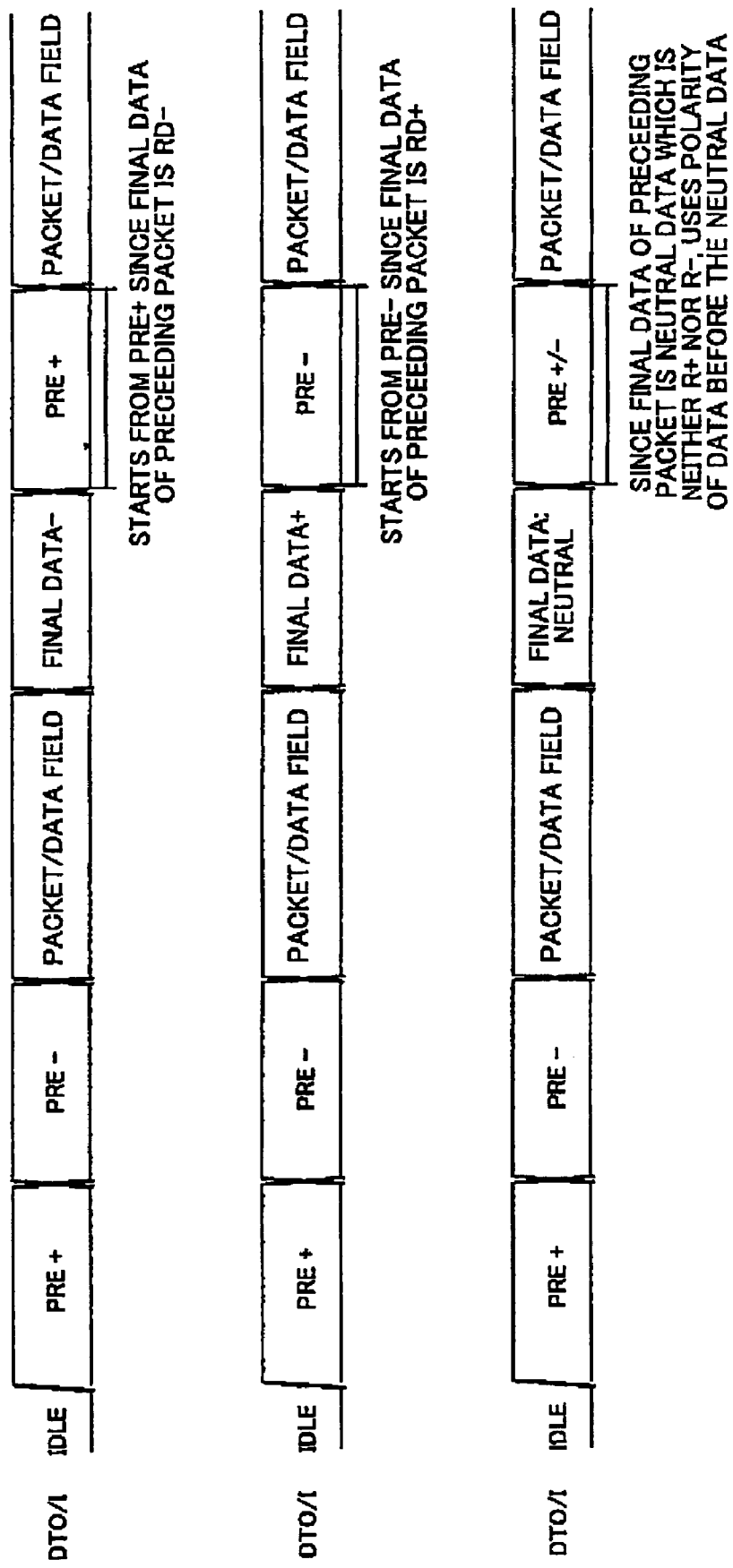
FIG. 6 is a data transfer format example during burst transfer.

FIG. 6 shows a data transfer format during burst transfer. As shown in FIG. 6, the transmitter side inserts one preamble code between packets during burst transfer and transmits the preamble code to the receiver side. The idle signal IDLE is not inserted between packets during burst transfer. The transfer rate of burst transfer can be increased by not inserting the idle signal IDLE. In the case where a reception error occurs due to phase shift, resynchronization can be accomplished by detecting the preamble code by inserting the preamble code between packets.

Figure 7:
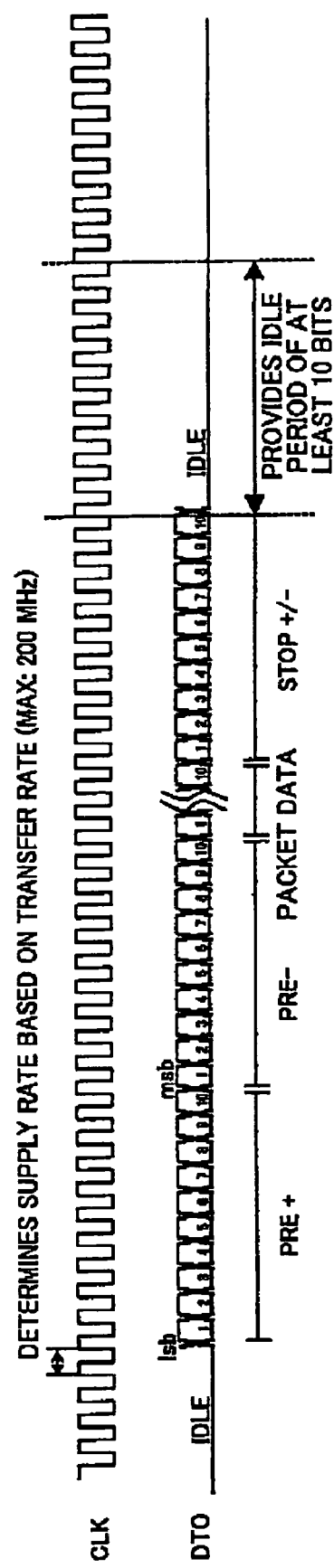
FIG. 7 is a signal waveform example when a host transmits data to a target.
Figure 8:
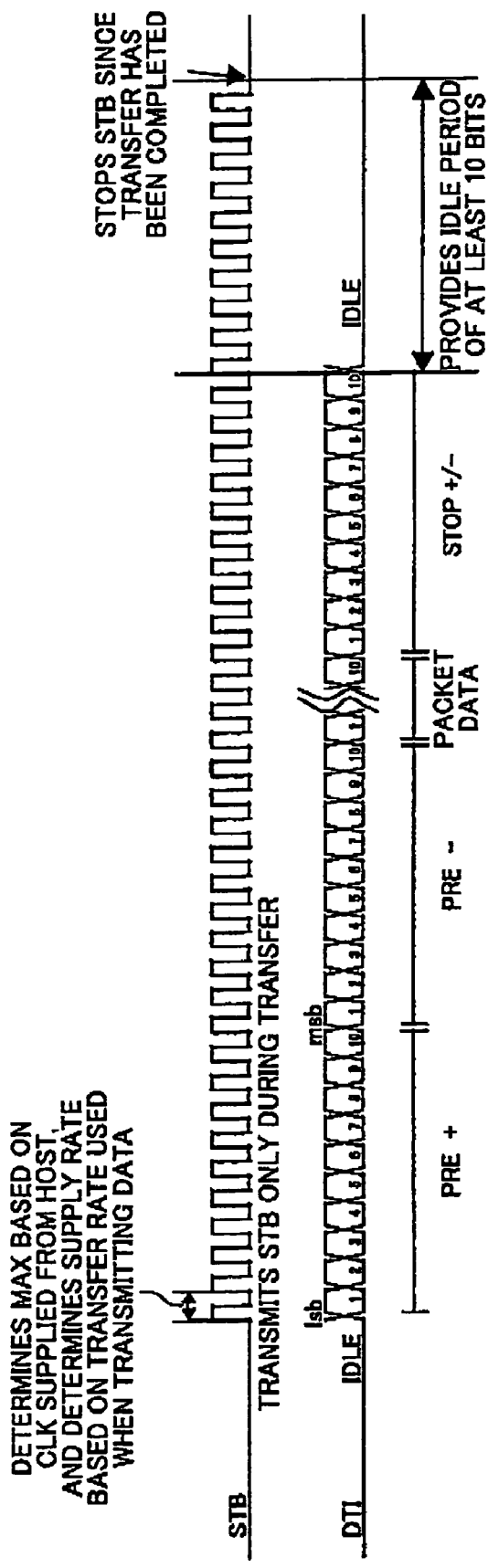
FIG. 8 is a signal waveform example when a target transmits data to a host.

FIG. 7 shows a signal waveform example when the host transmits data to the target, and FIG. 8 shows a signal waveform example when the target transmits data to the host. As shown in FIGS. 7 and 8, full-duplex transfer in which data is received while transmitting data can be performed in this embodiment. As shown in FIGS. 7 and 8, it is defined in the transfer format in this embodiment that an idle period of at least 10 bits is provided after data transfer.

6. Suspension of Operation of Logic Circuit in Idle Period

In PCI Express which is a high-speed serial interface for a personal computer, the idle code is output to the serial signal lines in the idle period. The idle code is encoded so that "0" or "1" does not continue in order to achieve DC balancing in the same manner as usual 8B/10B encoded data. Therefore, since the method of outputting the idle code in the idle period requires that the encoder circuit (code generation circuit), the parallel/serial conversion circuit, the serial/parallel conversion circuit, and the decoder circuit (code detection circuit) operate even in the idle period, a reduction of power consumption in the idle period cannot be achieved.

In this embodiment, as shown in FIGS. 7 and 8, the transmitter circuit outputs a differential signal of "0" (signal, logical level of which is continuously fixed at a first logical level in units of a given number of bits or more in a broad sense) to the serial signal lines as the idle signal in the idle period. In the idle period, the operation of at least one of the 8B/10B encoder circuit (code generation circuit) and the parallel/serial conversion circuit is suspended. The operation of at least one of the serial/parallel conversion circuit and the 8B/10B decoder circuit (code detection circuit) is also suspended. Suspension of operation means that encode processing (code generation processing), parallel/serial conversion processing, serial/parallel conversion processing, or decode processing (code detection processing) is not performed. Or, suspension of operation means that the clock signal supplied to the circuit which performs the above processing is suspended.

Figure 9A:
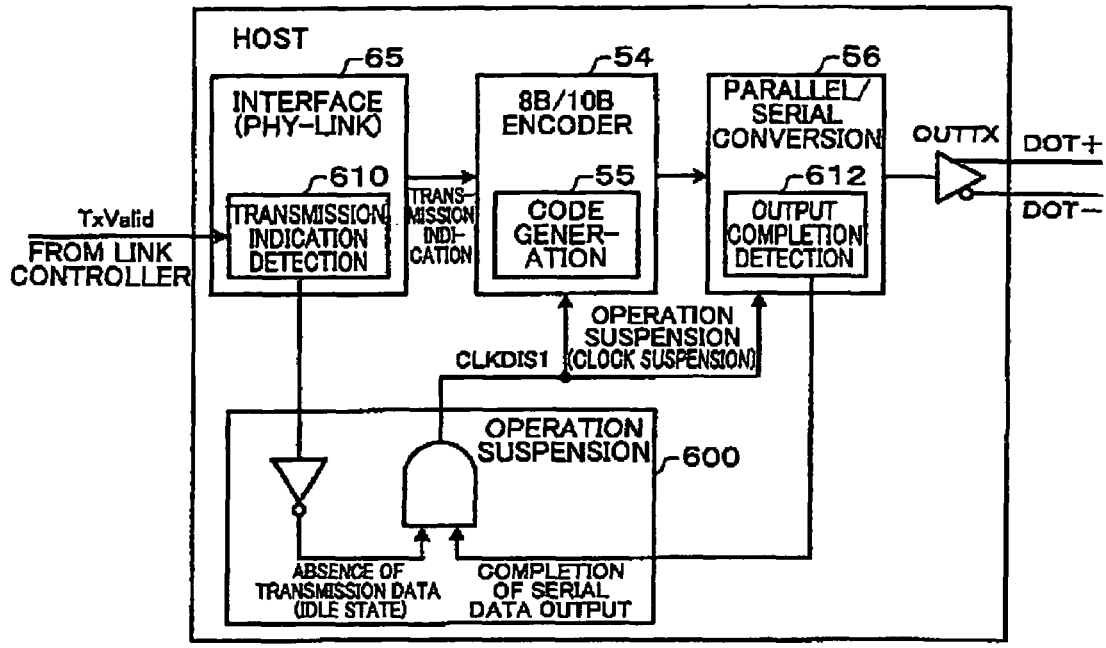
FIGS. 9A and 9B are illustrative of a method of suspending a circuit operation in an idle period.

In FIG. 9A, when the absence of transmission data has been indicated (when the idle period has been indicated) by a transmission valid signal TxValid (transmission data valid/invalid signal in a broad sense) from the link controller 200 (upper layer circuit), the 8B/10B encoder circuit 54 (code generation circuit 55) suspends the operation after the indication (at a given timing after the indication), for example. The parallel/serial conversion circuit 56 suspends the operation after the absence of transmission data has been indicated by the transmission valid signal TxValid and output of serial data from the parallel/serial conversion circuit 56 has been completed (at a given timing after the completion). In this case, the 8B/10B encoder circuit 54 and the parallel/serial conversion circuit 56 suspend the operation until transmission of the next packet starts.

In more detail, a transmission indication detection circuit 610 which detects transmission indication by the signal TxValid from the link controller 200 is provided in FIG. 9A. An output completion detection circuit 612 which detects completion of output of serial data from the parallel/serial conversion circuit 56 is provided. An operation suspension circuit 600 which suspends the operations of the 8B/10B encoder circuit 54 and the parallel/serial conversion circuit 56 is provided. The operation suspension circuit 600 asserts (activates) a clock disable signal CLKDIS1 when the signal TxValid has been negated (inactivated) to indicate the absence of transmission data and the idle period and output of serial data from the parallel/serial conversion circuit 56 has been completed. When the signal CLKDIS1 has been asserted, the clock signal supplied to the 8B/10B encoder circuit 54 and the parallel/serial conversion circuit 56 are suspended, whereby the operations of the circuits 54 and 56 are suspended. The operations of the circuits 54 and 56 may be suspended using an operation disable signal (reset signal or the like).

Figure 9B:
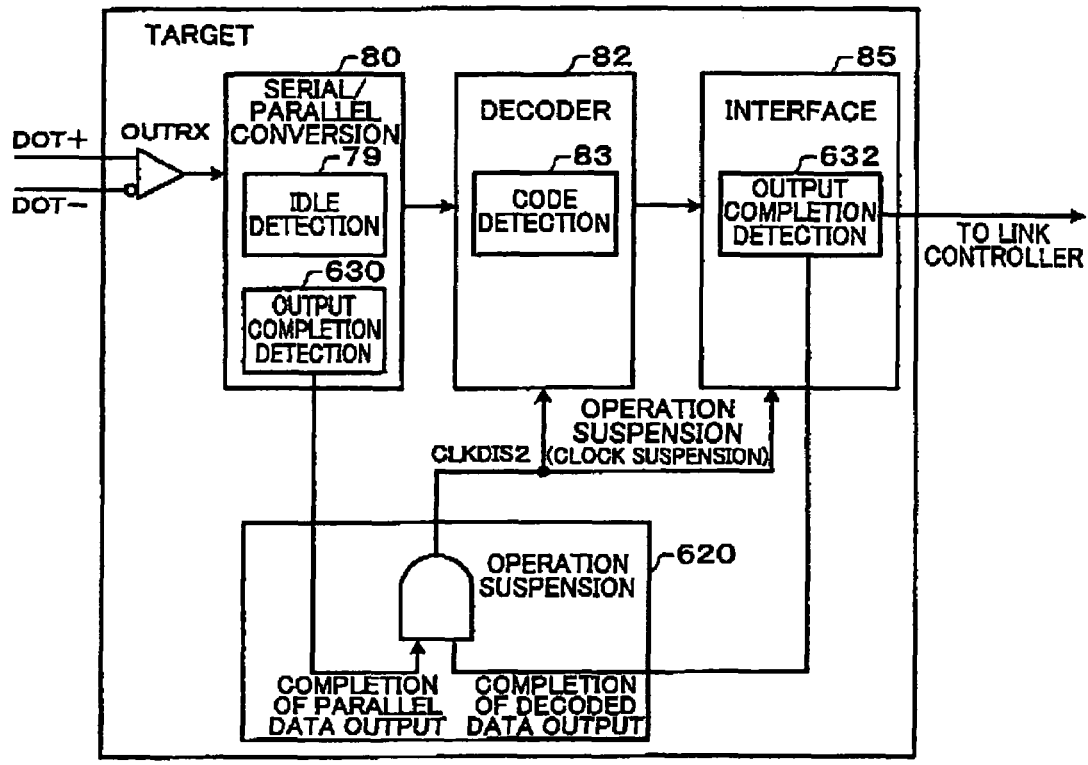

In FIG. 9B, the serial/parallel conversion circuit 80 suspends the operation after the idle signal has been detected and output of parallel data from the serial/parallel conversion circuit 80 has been completed (at a given timing after the completion). The 8B/10B decoder circuit 82 (code detection circuit 83) suspends the operation after the idle signal has been detected and output of decoded data from the decoder circuit 82 (interface circuit 85) has been completed (at a given timing after the completion). In this case, the serial/parallel conversion circuit 80 and the 8B/10B decoder circuit 82 suspend the operation until reception of the next packet starts.

In more detail, an idle detection circuit 79 which detects the idle signal and an output completion detection circuit 630 which detects completion of output of parallel data from the serial/parallel conversion circuit 80 are provided in FIG. 9B.

An output completion detection circuit 632 which detects completion of output of decoded data from the decoder circuit 82 (interface circuit 85) is provided. An operation suspension circuit 620 which suspends the operations of the serial/parallel conversion circuit 80 and the 8B/10B decoder circuit 82 is provided. The operation suspension circuit 620 asserts a clock disable signal CLKDIS2 when the idle signal has been detected by the idle detection circuit 79 and output of parallel data from the serial/parallel conversion circuit 80 has been completed. When the signal CLKDIS2 has been asserted, the clock signal supplied to the serial/parallel conversion circuit 80 and the 8B/10B decoder circuit 82 are suspended, whereby the operations of the circuits 80 and 82 are suspended. The operations of the circuits 80 and 82 may be suspended using an operation disable signal (reset signal or the like).

In this embodiment, since the idle signal consisting of a differential signal of "0" (may be "1") is output in the idle period instead of outputting the idle code, the operations of the encoder circuit (code generation circuit), the parallel/serial conversion circuit, the serial/parallel conversion circuit, and the decoder circuit (code detection circuit) can be suspended. Therefore, an unnecessary current can be effectively prevented from flowing through the logic circuit in the idle period, whereby a reduction of power consumption can be achieved. This reduces the amount of current flowing through a portable information instrument such as a portable telephone during standby.

In this embodiment, the idle signal is a signal which is continuously set at "0" (first logical level) in units of 10 bits (M bits) or more. The detection processing of the idle signal and the detection processing of the 10-bit (M-bit) special code and 10-bit encoded data shown in FIGS. 7 and 8 can be facilitated by setting the idle period in which the idle signal is set at "0" to 10 bits or more.

7. PHY-LINK Interface Signal

Figure 10:
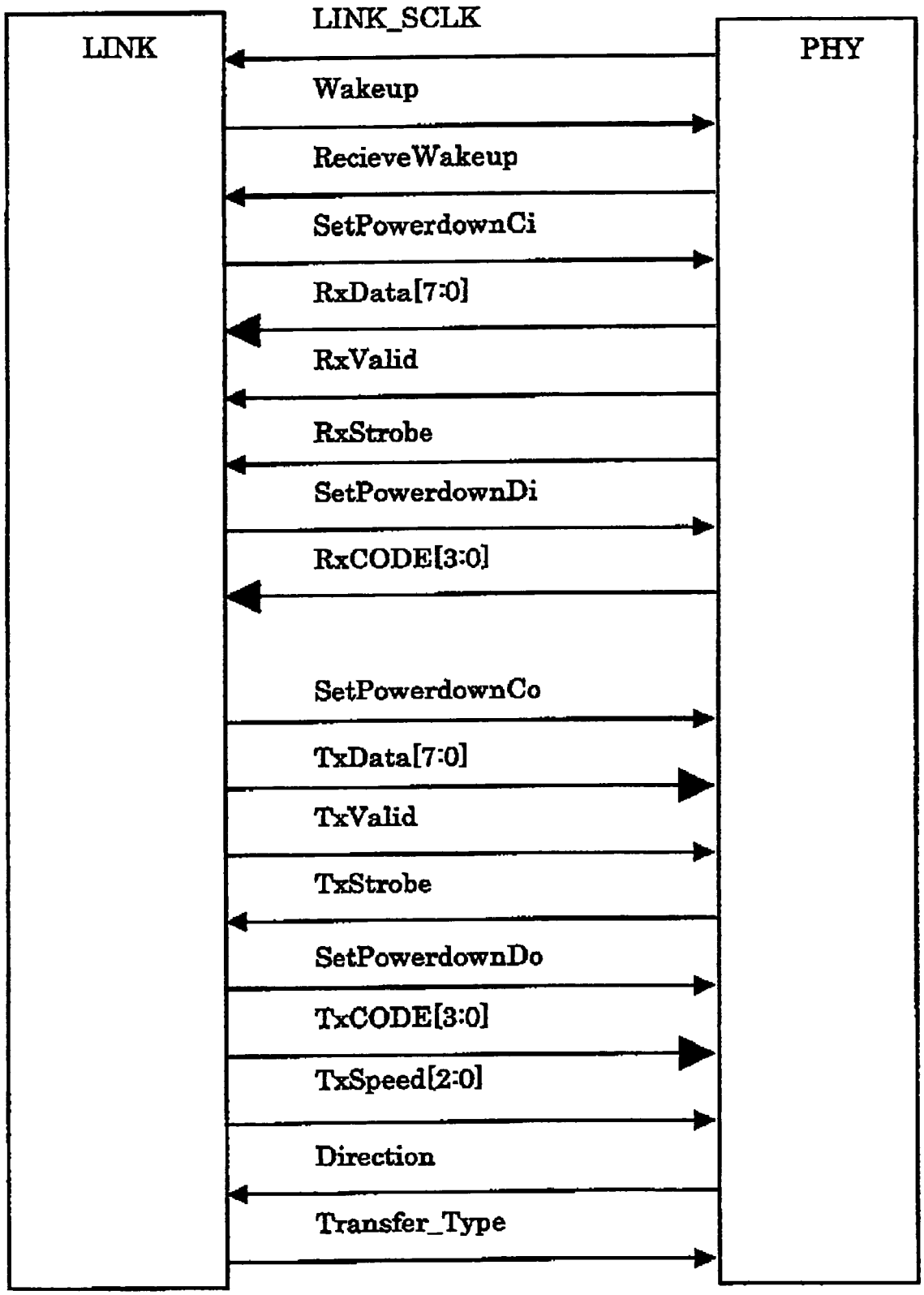
FIG. 10 is an example of a PHY-LINK interface signal.

FIG. 10 shows an example of PHY-LINK (between the interface circuits 65 and 67 or between the interface circuits 85 and 87) interface signals in this embodiment. In FIG. 10, a signal LINK_SCLK is a system clock signal supplied from the PHY (transceiver) to the LINK (link controller). A signal Wakeup is a wakeup signal for the LINK to cancel the power down state. A signal ReceiveWakeup is a signal for the PHY to notify the LINK of reception of the signal Wakeup. A signal SetPowerdownCi is a signal for the LINK to request the PHY to set the CLK/STB receiver circuit in the power down state. Data RxData[7:0] is 8-bit parallel reception data which is generated by decoding reception data received through the serial signal lines using the 8B/10B encoding circuit and is output to the LINK from the PHY. The data RxData[7:0] is output to the LINK from the PHY together with a signal RxStrobe in synchronization with the signal LINK_SCLK.

A signal RxValid is a signal which indicates a period from the start to the end of a packet received through the serial signal lines and is asserted during a period in which data is present in the PHY. The signal RxStrobe is a data strobe signal supplied to the LINK from the PHY. The data RxData[7:0] is output in a period in which the signal RxStrobe is asserted. A signal SetPowerdownDi is a signal for the LINK to request the PHY to set the data reception receiver circuit in the power down state.

A signal RxCODE[3:0] is a signal for the PHY to notify the LINK that the special code specified (defined) by the 8B/10B encoding method has been detected in the serial signal lines. The signal RxCODE[3:0] is output to the LINK from the PHY together with the signal RxStrobe in synchronization with the signal LINK_SCLK. FIG. 11 shows a specific example of the RxCODE value. The PHY must output "PREAMBLE detection" (RxCODE value=4) to the LINK when asserting the signal RxValid.

A signal SetPowerdownCo is a signal for the LINK to request the PHY to set the CLK/STB transmitter circuit in the power down state. Data TxData[7:0] is 8-bit parallel transmission data output to the serial signal lines. The LINK must hold the data TxData[7:0] and output it to the PHY until the PHY outputs the signal TxStrobe in synchronization with the signal LINK_SCLK.

The signal TxValid (transmission data valid/invalid signal) is a signal which indicates a period from the start to the end of a transmission packet and is a signal for the LINK to notify the PHY that the LINK has been prepared for transmission. The signal TxValid is asserted in a period in which transmission data is present in the LINK. The signal TxValid must be output in synchronization with the signal LINK_SCLK. A signal TxStrobe is a signal for the PHY to notify the LINK of completion of reception of data. The LINK must change the data TxData to the next data when the LINK has detected the signal TxStrobe. A signal SetPowerdownDo is a signal for the LINK to request the PHY to set the data transfer transmitter in the power down state.

A signal TxCODE[3:0] is a signal for the LINK to request the PHY to transmit the special code specified by the 8B/10B encoding. FIG. 12 shows a specific example of the TxCODE value. The LINK must output "PREAMBLE insertion" (TxCODE value=4) to the PHY when asserting the signal TxValid. The LINK must hold the signal TxCODE[3:0] and output it to the PHY until the PHY outputs the signal TxStrobe in synchronization with the signal LINK_SCLK.

A signal TxSpeed[2:0] is a signal used when the target directs the transfer rate of transmission data. A signal Direction, which is a half-duplex communication exclusive signal, is a signal for the PHY to notify the LINK of the current transfer direction of the serial signal lines during half-duplex communication. For example, the LINK is notified that the transfer direction is a forward direction (transfer from the host to the target) when the Direction value is "0", and is notified that the transfer direction is a reverse direction (transfer from the target to the host) when the Direction value is "1". The LINK is inhibited from outputting a transfer request in the transfer direction opposite to the transfer direction indicated by the Direction value. A signal Transfer_Type is a signal for the LINK to notify the PHY of the supported communication method. A Transfer_Type value of "0" indicates that full-duplex communication is supported, and a Transfer_Type value of "1" indicates that half-duplex communication is supported.

Figure 13:
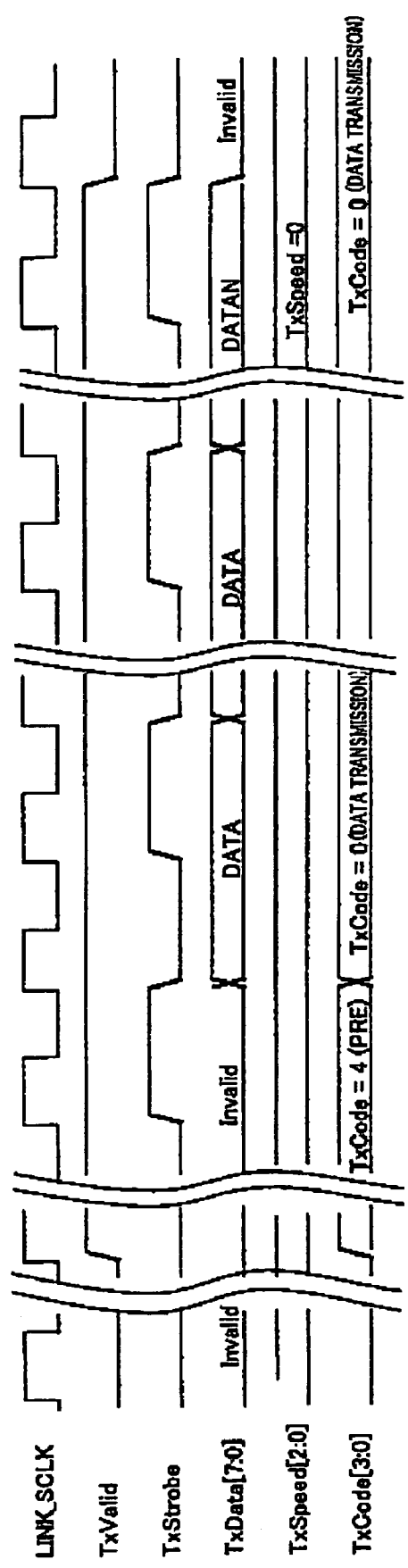
FIG. 13 is a waveform example of a PHY-LINK interface signal.

FIG. 13 shows a waveform example during data transmission of the PHY-LINK interface signals. When the transmitter-side LINK transmits data through the serial signal lines, the LINK notifies the PHY that the LINK has been prepared for data transmission by asserting the signal TxValid. After asserting the signal TxValid, the LINK sets the value of the signal TxCODE[3:0] shown in FIG. 12 to "4" to direct the PHY (8B/10B encoder circuit) to generate (output) the preamble code. The preamble code is a code assigned to the special code K28.1 of the 8B/10B code as shown in FIG. 4. When preparation for output of data to the serial signal line has been completed, the PHY asserts the signal TxStrobe for one clock signal period, whereby data transfer starts. The LINK sets the state in the data transfer state by setting the value of the signal TxCODE[3:0] to "0" when the LINK has detected the signal TxStrobe, and outputs the transmission data TxData[7:0] to the PHY. When the LINK has detected the signal TxStrobe, the LINK changes the data TxData to the next data in synchronization with the signal LINK_SCLK. The LINK negates the signal TxValid in synchronization with the signal LINK_SCLK when the LINK has detected the signal TxStrobe for the final data to finish data transmission. As described above, the LINK drives the signals other than the signal TxStrobe during transfer shown in FIG. 13.

As shown in FIG. 13, the case where the signal TxValid is negated means that transmission data does not exist and the state has transitioned to the idle state. In this case, in this embodiment, when the signal TxValid has been negated to indicate the absence of transmission data, the 8B/10B encoder circuit and the parallel/serial conversion circuit suspend the operation after the indication, as described with reference to FIG. 9A. The operation suspension control of the 8B/10B encoder circuit and the parallel/serial conversion circuit in the idle period can be implemented by simple processing by performing the operation suspension control by effectively utilizing the signal TxValid from the link controller (upper layer circuit).

As described with reference to FIGS. 12 and 13, in this embodiment, the 8B/10B encoder circuit (code generation circuit) of the PHY receives the special code generation direction signal TxCODE[3:0] from the link controller (upper layer circuit), and performs generation processing of the special code indicated by the signal TxCODE[3:0]. In FIG. 13, the link controller asserts the signal TxValid and then outputs the signal TxCODE[3:0] set to "4", for example. The link controller thus directs the 8B/10B encoder circuit (code generation circuit) of the PHY to generate (output) the preamble code assigned to the special code K28.1. The processing and the configuration of the 8B/10B encoder circuit can be simplified by directing generation of the special code using the signal TxCODE[3:0], whereby a reduction of the circuit scale or the like can be achieved.

8. Detection of Negative Preamble Code

In this embodiment, the idle signal consisting of a differential signal of "0" is output in the idle period, as shown in FIGS. 7 and 8. The positive preamble code PRE+ is transferred after the idle period. Then, the negative preamble code PRE− is transferred, and a data packet is then transferred. Power consumption can be reduced as described above by not outputting the idle code in the idle period. The receiver side can make preparations for reception of a data packet (synchronization) by inserting the preamble code between the idle period and the data packet.

However, the first bit of the positive preamble code PRE+ is "1" as shown in FIG. 4. Therefore, in the case where the preamble code PRE+ is transferred after a long idle period, since the data rapidly changes to "1" after "0" has continued for a long period, the receiver circuit or the like, which is an analog circuit, may not properly detect the change in data. If the change in data from "0" to "1" cannot be properly detected, a problem occurs in which an preamble error is indicated by mistake even if the preamble code PRE+ is sampled at a correct sampling edge.

Figure 14:
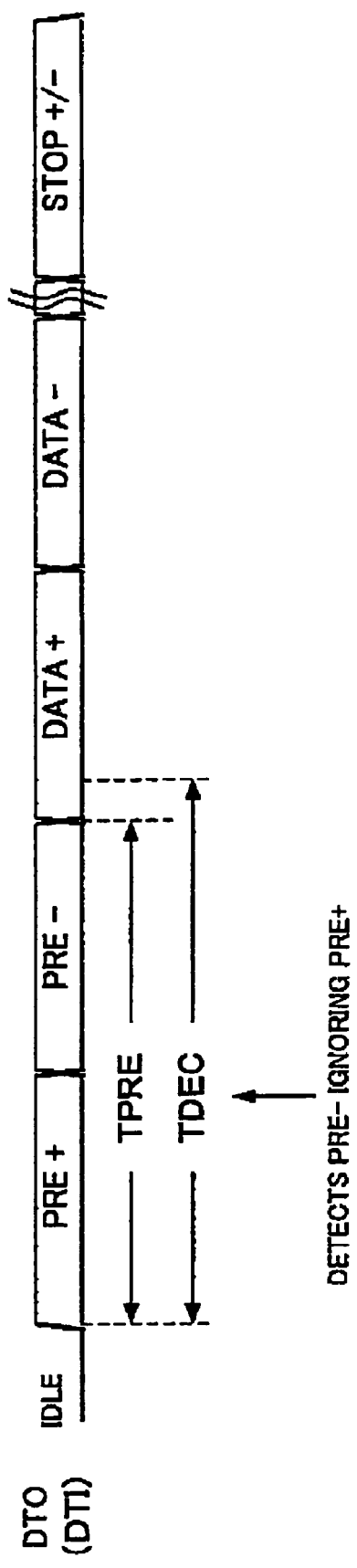
FIG. 14 is illustrative of a method of detecting only a preamble code PRE− ignoring a preamble code PRE+.

Therefore, in this embodiment, only the negative (second polarity) preamble code PRE− is detected ignoring the positive (first polarity) preamble code PRE+ as shown in FIG. 14. A preamble error is indicated by activating a preamble error notification signal on condition that the preamble code PRE− has not been detected (on condition that the preamble code PRE− has not been detected one or more times).

A preamble error is not detected even when the change in data from "0" to "1" at the first bit of the preamble code PRE+ cannot be detected by detecting only the preamble code PRE−, since the preamble code PRE+ is ignored. Therefore, a problem in which a preamble error is indicated by mistake can be prevented.

In FIG. 14, a period TPRE is a period necessary for transferring the preamble codes PRE+ and PRE− after the data has changed from "0", which indicates the idle state, to "1". For example, in the case where the preamble codes PRE+ and PRE− are 10-bit codes, the period TPRE is a period necessary for transferring 20 bits of data. In this case, it is preferable to perform the detection processing of the preamble code PRE− until a detection period TDEC longer than the period TPRE has elapsed after the data has changed from "0" to "1". A preamble error is indicated when the preamble code PRE− has not been detected within the detection period TDEC (when the preamble code PRE− has not been detected one or more times). This enables the preamble code PRE− to be reliably detected.

Specifically, when the data rapidly changes from "0" to "1" at the first bit of the preamble code PRE+, the receiver circuit which is an analog circuit may not follow the change, whereby a detection error may occur. Therefore, if the detection period TDEC is set to be the same as the period TPRE in length, the final bit of the preamble code PRE− or the like may not be detected, whereby an erroneous preamble error may be indicated.

On the other hand, the final bit of the preamble code PRE− or the like can be properly detected even if a detection error occurs at the first bit of the preamble code PRE+ by setting the detection period TDEC to be longer than the period TPRE as shown in FIG. 14, whereby occurrence of the above-described problem can be prevented.

The passage of the detection period TDEC may be measured using a detection period count circuit. In more detail, since the period TPRE is a period of 20 bits, a period of 21 bits or more may be set as the detection period TDEC, and the passage of the detection period TDEC of 21 bits or more may be counted using the detection period count circuit.

9. Configuration of Idle Detection Circuit and Preamble Error Detection Circuit

Figure 15:
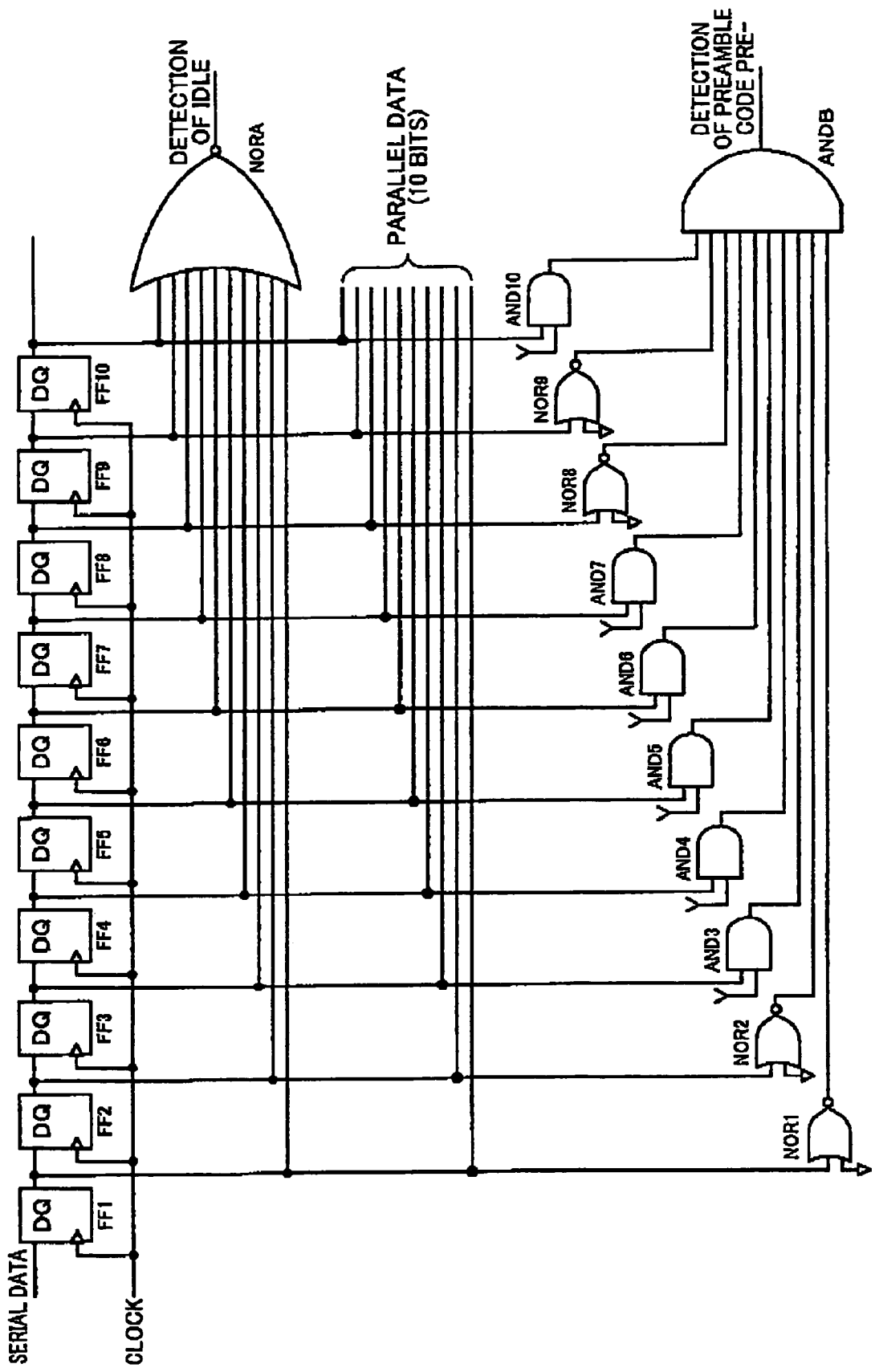
FIG. 15 is a configuration of an idle detection circuit and a preamble error detection circuit.

FIG. 15 shows a specific configuration example of the idle detection circuit and the preamble error detection circuit. The idle detection circuit and the preamble error detection circuit may be provided in the serial/parallel conversion circuit.

In FIG. 15, flip-flop circuits FF1 to FF10 connected in series are D flip-flop circuits for converting serial data to parallel data. In more detail, serial data is input to the flip-flop circuit FF1 in the first stage. The outputs from the flip-flop circuits FF1 to FF10 are output to the 8B/10B decoder circuit as 10-bit parallel data.

The outputs from the flip-flop circuits FF1 to FF10 are input to a circuit NORA. The output from the circuit NORA is an idle detection signal. Specifically, the output from the circuit NORA is "1" when the outputs from all the flip-flop circuits FF1 to FF 10 are "0", whereby the idle signal which is continuously set at "0" in units of 10 bits (M bits) is detected.

The outputs from the flip-flop circuits FF1 to FF10 are connected with one input of circuits NOR1, NOR2, AND3 to AND7, NOR8, NOR9, and AND10. VSS (logical level "0") is connected with the other input of the circuits NOR1, NOR2, NOR8, and NOR9, and VDD (logical level "1") is connected with the other input of the circuits AND3 to AND7 and AND10. The outputs from the circuits NOR1, NOR2, AND3 to AND7, NOR8, NOR9, and AND10 are input to a circuit ANDB. The output from the circuit ANDB is "1" when all of these outputs are "1". This enables the negative preamble code PRE−having a value of "0011111001" as shown in FIG. 4 to be detected. When the preamble code PRE−has not been detected (when the output from the circuit ANDB has not become "1") in the period TDEC shown in FIG. 14 after the idle signal has been detected (after the output from the circuit NORA has become "1"), it can be judged that a preamble error has been detected. In this case, the preamble error detection circuit notifies the link controller in the upper layer that the preamble error has been detected.

Power consumption can be reduced in comparison with the case of outputting the idle code by outputting the idle signal consisting of a differential signal of "0" in the idle period and detecting only the preamble code PRE− while detecting the preamble code PRE+. Moreover, the preamble code can be reliably detected without causing erroneous detection by detecting only the preamble code PRE−.

10. Electronic instrument

Figure 16:
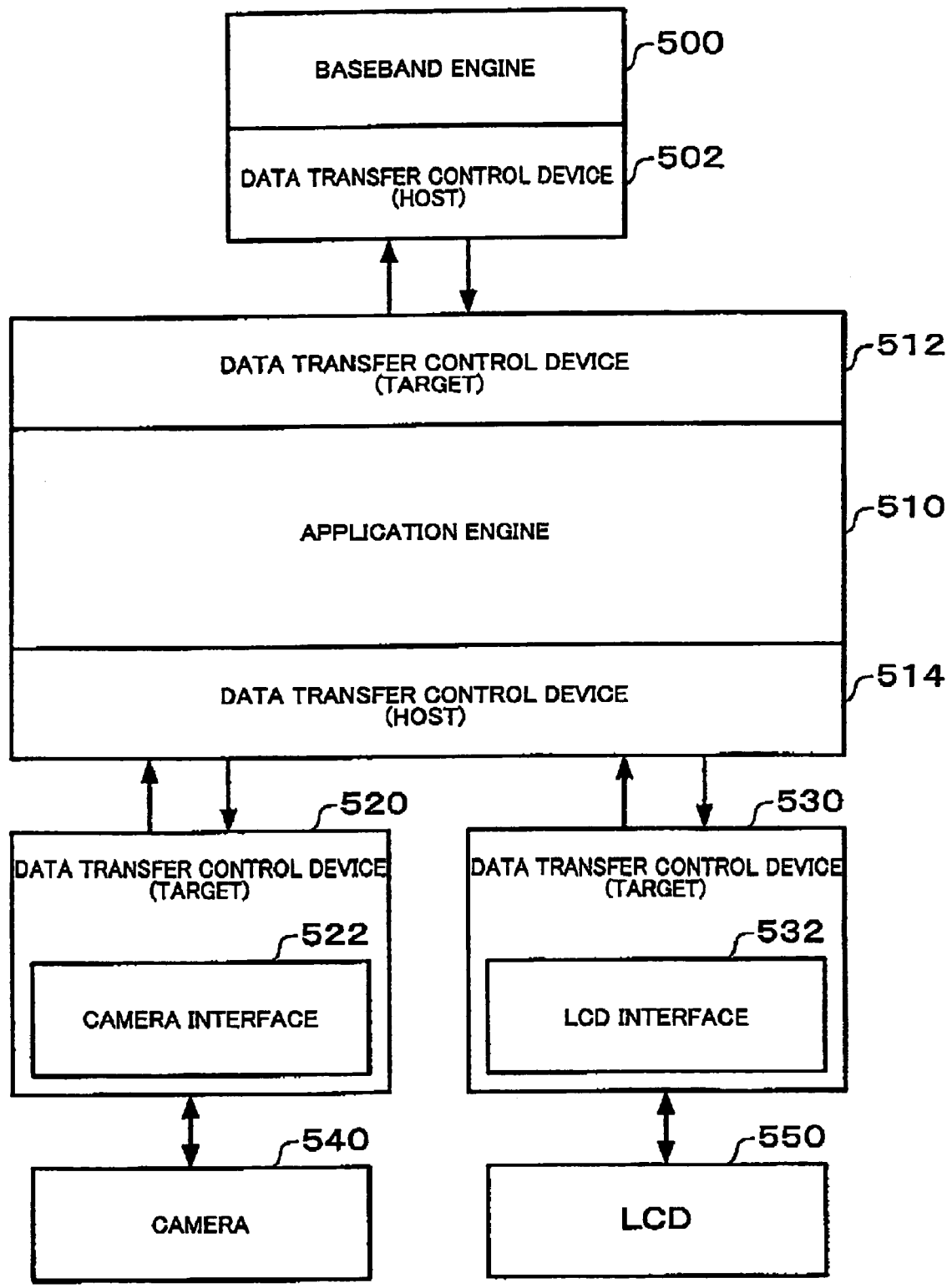
FIG. 16 is a configuration example of an electronic instrument.

FIG. 16 shows a configuration example of an electronic instrument in this embodiment. The electronic instrument includes data transfer control devices 502, 512, 514, 520, and 530 described in this embodiment. The electronic instrument also includes a baseband engine 500 (communication device in a broad sense), an application engine 510 (processor in a broad sense), a camera 540 (imaging device in a broad sense), and an LCD 550 (display device in a broad sense). In other words, the electronic instrument shown in FIG. 16 includes the target-side data transfer control devices 520 and 530, the host-side data transfer control device 514 connected with the target-side data transfer control devices 520 and 530 through a serial bus (serial signal lines), and one or more devices 540 and 550 connected with the target-side data transfer control devices 520 and 530 through an interface bus. The electronic instrument may have a configuration in which some of these blocks are omitted. According to this configuration, a portable telephone or the like having a camera function and a display function of a liquid crystal display (LCD) can be implemented. However, the electronic instrument in this embodiment is not limited to the portable telephone, and may be applied to various electronic instruments such as a digital camera, PDA, electronic notebook, electronic dictionary, or portable information terminal.

As shown in FIG. 16, the serial transfer described in this embodiment is performed between the host-side data transfer control device 502 provided to the baseband engine 500 and the target-side data transfer control device 512 provided to the application engine 510 (graphic engine). The serial transfer described in this embodiment is also performed between the host-side data transfer control device 514 provided to the application engine 510 and the data transfer control device 520 including a camera interface circuit 522 or the data transfer control device 530 including an LCD interface circuit 532.

According to the configuration shown in FIG. 16, EMI noise can be reduced in comparison with a conventional electronic instrument. Moreover, power consumption of the electronic instrument can be further reduced by implementing a reduction of the scale and power consumption of the data transfer control device. In the case where the electronic instrument is a portable telephone, a serial signal line can be used as a signal line which passes through a connection section (hinge section) of the portable telephone, whereby mounting can be facilitated.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention. Any term (link controller, 8B/10B encoder circuit, 8B/10B decoder circuit, 8 bits, 10 bits, positive code, negative code, differential signal line) cited with a different term having broader or the same meaning (upper layer circuit, encoder circuit, decoder circuit, N bits, M bits, first polarity, second polarity, serial signal line) at least once in this specification and drawings can be replaced by the different term in any place in this specification and drawings. The configurations of the data transfer control device, the transceiver, the link controller, and the like are not limited to the configurations described with reference to FIGS. 1 to 3. The circuit operation suspension method in the idle period is not limited to the method described in this embodiment.

What is claimed is:

1. A data transfer control device for performing data transfer through a serial signal line, the data transfer control device comprising:
   a receiver circuit that receives a special code and data through the serial signal line;
   a serial/parallel conversion circuit that receives serial data from the receiver circuit and converts the serial data to parallel data;
   an idle detection circuit that detects an idle signal, a logical level of the idle signal being continuously fixed at a first logical level in units of a given number of bits or more;
   a decoder circuit that receives parallel data from the serial/parallel conversion circuit and performs decode processing of the data and the special code that have been encoded by using a predetermined encoding method; and
   a preamble error detection circuit that performs detection processing of a preamble code that is the special code and informs a preamble error when the preamble code has not been detected,
   the serial/parallel conversion circuit suspending operation after the idle signal has been detected by the idle detection circuit and output of parallel data from the serial/parallel conversion circuit has been completed,
   when a first polarity preamble code and a second polarity preamble code are transferred through the serial signal line, the preamble error detection circuit omitting detection processing of the first polarity preamble code that has been received first and performing detection processing of the second polarity preamble code that has been received after the first polarity preamble code,
   the polarity of the first polarity preamble code and the polarity of the second polarity preamble code being different,
   the first polarity preamble code and the second polarity preamble code being transferred after the idle signal, and
   the preamble error detection circuit performing the detection processing of the second polarity preamble code after the idle detection circuit determines that the idle signal is not detected.

2. The data transfer control device as defined in claim 1, the decoder circuit suspending operation after the idle signal has been detected by the idle detection circuit and output of decoded data from the decoder circuit has been completed.

3. The data transfer control device as defined in claim 1, comprising:

an operation suspension circuit that suspends operations of the decoder circuit and the serial/parallel conversion circuit, the operation suspension circuit suspending operations of the decoder circuit and the serial/parallel conversion circuit by suspending a clock signal supplied to the decoder circuit and the serial/parallel conversion circuit.

4. An electronic instrument, comprising:
the data transfer control device as defined in claim 1; and
at least one of a communication device, a processor, an imaging device, and a display device.

5. An electronic instrument, comprising:
the data transfer control device as defined in claim 2; and
at least one of a communication device, a processor, an imaging device, and a display device.

6. An electronic instrument, comprising:
the data transfer control device as defined in claim 3; and
at least one of a communication device, a processor, an imaging device, and a display device.

7. The data transfer control device as defined in claim 1, the preamble error detection circuit performing the detection processing of the second polarity preamble code until a detection period ($T_{DEC}$) has elapsed after the logical level of the serial signal line has changed from the first logical level to a second logical level, the first logical level being the logical level of the idle signal, the detection period ($T_{DEC}$) being longer than a period ($T_{PRE}$), the period ($T_{PRE}$) being a period necessary for transferring the first preamble code and the second preamble code.

8. The data transfer control device as defined in claim 1,
the idle detection circuit setting an idle detection signal to an active level when M bits (M is an integer larger than one) of the parallel data from the serial/parallel conversion circuit are detected to be the first logical level and setting the idle detection signal to a non-active level when one bit of the parallel data is detected to be a second logical level, and the preamble error detection circuit starting the detection processing that compares a bit pattern of the parallel data with a bit pattern of the second polarity preamble code after the idle detection signal is set to the non-active level.

9. The data transfer control device as defined in claim 8,
the preamble error detection circuit starting a counting process of a detection period ($T_{DEC}$) after the idle detection signal is set to the non-active level, the preamble error detection circuit determining that the second polarity preamble code is detected when the bit pattern of the parallel data is coincided with the bit pattern of the second polarity preamble code within the detection period ($T_{DEC}$), and the detection period ($T_{DEC}$) being longer than a period ($T_{DEC}$), the period ($T_{PRE}$) being a period of 2M bits to transfer the first polarity preamble code and the second polarity preamble code that are M-bit (M is an integer larger than one) special codes.

* * * * *